United States Patent Office 3,499,077
Patented Mar. 3, 1970

3,499,077
METHODS OF CONTROLLING NEMATODES BY THE APPLICATION OF N-(ALPHA-CYANO)-ALIPHATICAMIDES OF O,O - DIALKYLTHIOPHOSPHORYLACETIC ACID
Lindley S. De Atley, Shawnee Mission, and Charles Allan Shadbolt, Prairie Village, Kans., assignors to Thompson Hayward Chemical Co., Kansas City, Kans., a corporation of Delaware
No Drawing. Filed Feb. 16, 1968, Ser. No. 705,931
Int. Cl. A01n 9/36, 9/12
U.S. Cl. 424—210                                  3 Claims

ABSTRACT OF THE DISCLOSURE

The invention relates to a method of controlling pestiferous organisms, particularly nematodes, which comprises causing said organisms to be contacted with a small but effective amount of a compound of the formula

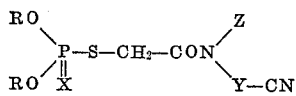

wherein each R is alkyl; X is sulfur or oxygen; Z is hydrogen or alkyl; and Y is an aliphatic hydrocarbon radical.

This invention relates to and has for its objects the provision of novel methods of controlling certain pestiferous organisms, and new compositions useful therefor. More particularly this invention relates to a novel method of controlling nematodes and to new compositions useful for this purpose.

Nematodes are parasitic organisms which attack the roots of plants, stunting root growth, and thereby causing serious damage to the plant host. Nematodes attack a wide range of plants including many vegetable crops, fruit crops and grasses, causing great damage to said crops and a high rate of economic loss. It is also known that one species of nematode is capable of attacking many different kinds of plants and therefore good control of these pestiferous organisms is highly desirable.

Heretofore, certain nematocidal compositions have been employed to control these parasitic organisms, generally without complete success. The nematocidal compositions heretofore employed suffered from many disadvantages which precluded obtaining control of the parasitic nematodes. More particularly, it was found that the nematocidal compositions heretofore employed were unpredictably erratic in their behavior, were sometimes extremely phytotoxic to the plant host sought to be protected, and in addition, were composed of such materials as to be dangerous and even injurious to the health of man and animals, for example, halogenated hydrocarbons have been widely employed.

A method has now been found whereby satisfactory control of these parasitic nematodes can be obtained while at the same time overcoming the disadvantages heretofore existing in this art. It has now been found that nematode pests may be effectively controlled by contacting said pests or causing said pests to be contacted with a small but effective amount of a member of the group consisting of compounds of the formula:

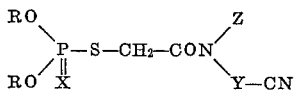

wherein each R is lower alkyl; X is sulfur or oxygen; Z is hydrogen or lower alkyl; and Y is an aliphatic hydrocarbon radical. Preferably, R is lower alkyl of less than seven carbon atoms; X is sulfur or oxygen; Z is hydrogen or lower alkyl of less than seven carbon atoms; and Y is a straight or branched chain divalent aliphatic hydrocarbon radical of less than seven carbon atoms.

The compounds which may be employed in the practice of the instant invention may be prepared in accordance with the teachings and disclosures set forth in U.S. Patent 3,033,744, issued May 8, 1962.

The nematodes sought to be controlled by the practice of this invention are contacted or caused to be contacted with nematocidal amounts of the compounds of this invention in their natural environment and for this purpose they may be incorporated into the soil in which the host plant is grown. To accomplish this purpose, the nematocidal compound may be mechanically incorporated into the soil or alternatively may be incorporated therein by applying the nematocidal compositions of this invention to the surface of the soil sought to be treated and thereafter applying to, or "drenching" the surface with, water or some other suitable solvent to cause the nematocidal compositions to become incorporated in the soil. However, any method whereby the nematocidal compounds are incorporated into the soil and thus brought in contact with the nematode to be controlled may be satisfactorily employed in the pracice of this invention.

The compounds of this invention may be employed in the nematocidal compositions which may be prepared by combining the nematocidal compounds of this invention with a substantial amount of a conventional carrier which is inert to the nematocidal compound, to form solutions, dusts, wettable powders, granules and other like formulations. To prepare these compositions in the form of granules, powder or dust, the nematocidal compounds of this invention may be mixed with any of a number of carriers either organic or inorganic in nature which are suitable for the manufacture of pulverulent preparations. In addition to mixing the ingredients directly, the nematocidal compounds of this innvention may first be dissolved in a suitable solvent and the dry extending agents may be treated with the resulting solution so that after the solvent evaporates off the active ingredient is effectively impregnated by adsorption or absorption on the carrier. The carriers which may be employed include, for example, tricalcium phosphate, calcium carbonate, attapulgite, kaolin, bole, kieselguhr, montmorillanite, talc, calcined magnesia and others. Materials of vegetable origin such as powdered cork, powdered wood and powdered walnut shells are also useful. These resultant compositions may be used in the dry form or, by the addition of wetting agents, the dry powder can be rendered wettable by water so as to obtain stable aqueous dispersions suitable for employment as liquid compositions. Among the solvents which may be employed in the practice of this invention may be included such materials as naphtha, kerosene, toluene, cyclohexanone, actone and the like, as may be determined by the skilled worker.

It has been found that satisfactory results are obtained in the practice of this invention, when the nematocidal compound of the invention is present in these compositions in an amount of from 1.0% to 95.0% by weight of the final composition, and optimally, in the amount of from 4.0% to 80.0% by weight of the final composition incorporated in the soil wherein the nematode pests sought to be controlled are found.

Among the parasitic nematodes which may be controlled by the practice of this invention may be included such species of nematode as, Meloidogyne, Radopholus, Heterodera, Pratylenchus, and other like species. It has been preferably found that the practice of this invention results in the control of the Meloidogyne species of nematode.

Satisfactory control of the nematode parasites is obtained in the practice of this invention when the nematode sought to be controlled is caused to be contacted with the nematocidal compounds of this invention in a concentration of 750 parts per million or less, and most preferably in a concentration of 500 parts per million or less.

The invention may be further illustrated by the following examples:

EXAMPLE 1

Sample compounds are tested as soil treatments for the control of the root knot nematode, *Meliodogyne hapla* using tomato seedlings as the index crop. A stock culture of root knot nematode (*Meliodogyne hapla*) is retained in large containers in the greenhouse in which tomato plants are constantly being replaced in order to replenish the food supply of the nema. This heavily infested stock culture for use purposes is then diluted in a ratio of one part infested soil to eight parts of ordinary greenhouse potting soil. This results in a soil mixture containing a moderately heavy inoculum potential.

Sample compounds for test purposes are prepared as acetone-water solutions, as wettable powders, or granules and thoroughly incorporated or admixed into the root knot infested soil. This treated soil lot is then allocated to four replicated pots and covered for a period of 24 hours in order to permit any fumigant action to take place in the event that the chemicals do have some degree of vapor pressure. The pots are then uncovered and still allowed to remain unplanted for a period of three days in order to allow some dissipation of the chemical in the event that they should be phytotoxic. At the end of this period they are planted with tomato seedlings which provide good index plants for the development of the root knot gall. The extent of control (lack of root knot or gall formation) is observed some three weeks later at which time the plants are removed from their pots, the root systems thoroughly washed and the extent of root galling observed and recorded.

Data are recorded on root knot control. Root knot control is expressed as the "Root Knot Index." Plants are rated on a scale of 5 to 0 in which 5 indicates no root knots being present, or 100% control, to the other extreme where 0 indicates that no root knot control was present and the root system looked similar to the untreated controls. The results obtained are reported in Table 1 below.

TABLE 1.—ROOT KNOT POT TEST

| Sample compound | Dose, p.p.m. | Root knot index |
|---|---|---|
| O,O-diethyl thiophosphorylacetic acid | 25.0 | 5.0 |
| Alphacyanisopropylamide | 12.5 | 5.0 |
|  | 6.25 | 4.5 |
|  | 3.12 | 2.5 |
| Control | 0 | 0 |

EXAMPLE 2

The test material was employed in a granular form having 5% active ingredient. The granular test material was impregnated into the soil on the upper surface thereof, followed by a drenching to wash the test material into the vicinity of the roots of the Red Kidney bean plants being treated. The resultant concentrations of active ingredients was determined by parts per million in weight of the soil. The results of the control of the respective fungi on the test plants is reported below in Table 2, wherein 5 denotes complete control and 0 denotes no control.

TABLE 2

| Test material | Conc., p.p.m. | Fungus | Fungus control rate |
|---|---|---|---|
| O,O-diethyl thiophosphorylacetic acid | 100 | *Erysiphe polgoni* | 2 |
| α-Cyanisopropylamide | 50 | *Erysiphe polgoni* | 1 |
| Karathane | 500 | *Erysiphe polgoni* | 4 |
|  | 250 | *Erysiphe polgoni* | 2 |
| Control |  | *Erysiphe polgoni* | 0 |
| α-Cyanisopropylamide | 500 | *Alterneria solani* | 0 |
| Maneb | 150 | *Alterneria solani* | 4+ |
|  | 100 | *Alterneria solani* | 3 |
| Control |  | *Alterneria solani* | 0 |

The foregoing example demonstrates that although in certain instances the test material exerts some fungicidal activity it cannot be considered to be of practical utility.

What is claimed is:

1. A method of controlling nematodes selected from the group consisting of the species *Meliodogyne, Radopholus, Heterodera* and *Protylenchus* which comprises causing said nematodes to be contacted with a small but effective amount of a compound of the formula:

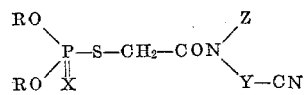

wherein each R is lower alkyl of less than seven carbon atoms; X is selected from the group consisting of oxygen and sulfur; Z is selected from the group consisting of hydrogen and lower alkyl of less than seven carbon atoms; and Y is a divalent aliphatic hydrocarbon radical of less than seven carbon atoms.

2. The method of claim 1, wherein each R is ethyl; X is oxygen; Z is hydrogen and Y is isopropyl.

3. The method of claim 1, wherein the nematode is caused to be contacted with the compound in a concentration of at least 3.12 parts per million.

References Cited

UNITED STATES PATENTS

| 2,965,533 | 12/1960 | Whetstone | 424—210 |
| 2,992,158 | 7/1961 | Berkelhammer | 424—210 |
| 3,033,744 | 5/1962 | Losco et al. | 424—210 |
| 3,301,749 | 1/1967 | Sakai et al. | 424—210 |

ALBERT T. MEYERS, Primary Examiner

J. V. COSTIGAN, Assistant Examiner